UNITED STATES PATENT OFFICE.

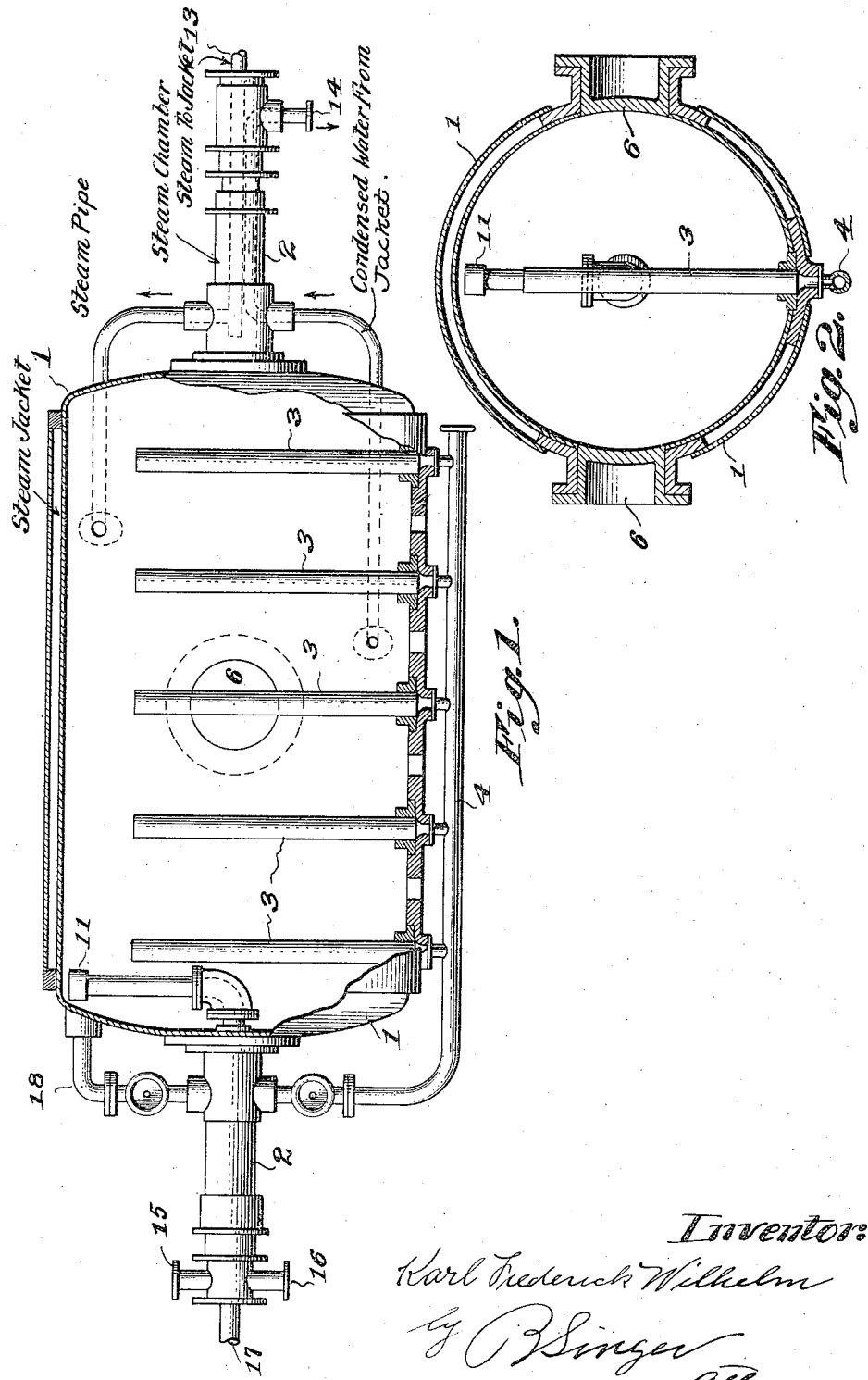

KARL FRIEDRICH WILHELM, OF STRALSUND, GERMANY.

OIL AND LIKE EXTRACTOR.

1,418,503.  Specification of Letters Patent.  Patented June 6, 1922.

Application filed November 11, 1913. Serial No. 800,352.

(GRANTED UNDER THE PROVISIONS OF THE ACT OF MARCH 3, 1921, 41 STAT. L., 1313.)

*To all whom it may concern:*

Be it known that I, KARL FRIEDRICH WILHELM, a subject of the Emperor of Germany, residing at Stralsund, Germany, have invented certain Improvements in Oil and like Extractors (for which I have secured patents in Germany, #D. R. P. 289,959, filed January 1, 1913; Belgium, #260,930, filed October 8, 1913; France, #457,057, filed April 8, 1913; Norway, #24,937, filed March 17, 1913; and Great Britain, #25,026/1913, filed December 31, 1913), of which the following is a specification.

The present invention relates to an apparatus for extracting oil and fat from materials of various kinds, and consists in the provision of a hollow double-walled vessel which is rotatably suspended by means of hollow shafts and provided in its interior with a series of transverse filtering pipes which communicate with one of the hollow shafts so that liquid can be discharged while the vessel is in motion, the pipe serving at the same time the purpose of stirring the contents of the vessel. A solvent can be introduced through the shaft into the vessel while the latter is in motion, and steam can at the same time be circulated through the space between the walls. Owing to the movement of the filtering pipes during the discharge and to the continuous introduction of fresh solvent, the filtering apertures of the pipes are prevented from being clogged up.

In the accompanying drawings the invention is illustrated,

Fig. 1 representing a sectional side view of the apparatus, and

Fig. 2, a cross-section of the same.

The apparatus is composed of a double-walled hollow cylinder 1 having at each end a hollow shaft 2 by means of which it is rotatably supported in suitable bearings. The hollow shafts serve as means for the introduction into the vessel 1 of steam and liquids as well as for the discharge of the various products. Thus, for instance, steam may be introduced into the space between the walls of the cylinder through the medium of a pipe 13 passing through the right shaft, the condensed water being discharged at 14. A dissolving agent may be admitted through the left shaft at 15, and liquids may be discharged at 16. A pipe 17, passing through the shaft 2, communicates with a pipe 11 which it holds in an upright position within the vessel 1 for leading off gases and vapours accumulating in the upper part of the latter. The vessel is provided with manholes 6 which are normally closed in the usual manner.

A row of transverse pipes 3 is fixed up within the vessel 1 as shown in Fig. 3. These pipes are provided with flanges 18 by means of which they are secured to the cylinder wall, and they communicate, through apertures in the wall and through short pipes adjoining the same, with a main pipe 4 carried along the vessel and communicating with one of the hollow shafts. The pipes 3 are perforated and covered by a filtering layer which may be more or less thick according to the nature of the materials under treatment. The extract-bearing solution is drawn off through a pipe 18, which connects the hollow shaft 2 with the interior of the cylinder.

While the pipes 3 serve as filters for the extract-bearing liquid and enable the latter to be drawn off in clear condition, they also, in turning with the cylinder 1, tend to disintegrate the materials, and to mix them thoroughly with the dissolving agent. This is of great importance particularly in the case of materials having a tendency to clod and which, if allowed to do so, cannot be properly dried.

I claim:

1. In an apparatus for extracting oil and fat from various materials, the combination with a double-walled hollow cylinder which is rotatably supported on hollow shafts, of transverse filtering pipes detachably arranged within the cylinder, a discharge pipe carried along the outside of the cylinder and communicating, through apertures made in the cylinder wall, with the filtering pipes and also with the hollow shaft, so that liquid can be discharged during the rotation of the cylinder, means for introducing a solvent into the cylinder through one of the shafts while the cylinder is in motion, and means for simultaneously circulating steam through the space between the walls.

2. In an apparatus for extracting oil and fat from various materials, the combination with a double-walled hollow cylinder which is rotatably supported on hollow shafts, of transverse filtering pipes detachably arranged within the cylinder, a discharge pipe carried along the outside of the cylinder and communicating, through apertures made in the cylinder wall, with the filtering pipes and also with the hollow shaft so that liquid can be discharged during the rotation of the cylinder, means for introducing a solvent into the cylinder through one of the hollow shafts, means for simultaneously circulating steam through the space between the cylinder walls, and a second discharge pipe connected to the end wall of the cylinder near the circumference and communicating with the cylinder as well as with the hollow shaft so that liquid can be drawn off from various altitudes within the cylinder according to the position of the pipe inlet, substantially as and for the purpose set forth.

KARL FRIEDRICH WILHELM.

Witnesses:
  BRUNO LANDSBERG,
  EMIL SCHMIDT.